United States Patent
Itoh et al.

(10) Patent No.: US 7,582,900 B2
(45) Date of Patent: Sep. 1, 2009

(54) ARRAY SUBSTRATE FOR AN IMAGE DISPLAY DEVICE

(75) Inventors: Yasuyoshi Itoh, Tokyo (JP); Kaoru Motonami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 11/624,419

(22) Filed: Jan. 18, 2007

(65) Prior Publication Data

US 2007/0200111 A1 Aug. 30, 2007

(30) Foreign Application Priority Data

Feb. 28, 2006 (JP) .............................. 2006-051627

(51) Int. Cl.
*H01L 33/00* (2006.01)
(52) U.S. Cl. .......................... 257/59; 349/113; 349/42; 349/46; 257/72; 257/E27.152
(58) Field of Classification Search ................. 349/114, 349/113, 42, 103; 257/59, 72, 257, 290, 257/351; 345/92
See application file for complete search history.

(56) References Cited

U.S. PATENT DOCUMENTS

2005/0140868 A1* 6/2005 Hwang ....................... 349/114

FOREIGN PATENT DOCUMENTS

| JP | 10-104663 | 4/1998 |
|---|---|---|
| JP | 10-221704 | 8/1998 |
| JP | 11-258596 | 9/1999 |
| JP | 11-337961 | 12/1999 |
| JP | 2001-13524 | 1/2001 |
| JP | 2002-182226 | 6/2002 |
| JP | 3564358 | 6/2004 |
| JP | 2005-275432 | 10/2005 |

* cited by examiner

*Primary Examiner*—Marcos D. Pizarro
*Assistant Examiner*—Eva Yan Montalvo
(74) *Attorney, Agent, or Firm*—Oblon, Spivak, McClelland, Maier & Neustadt, P.C.

(57) ABSTRACT

An additional circuit is formed on a glass substrate, and a passivation film is deposited thereon. After an insulation film is deposited on the passivation film, a contact hole is formed, and a signal line is deposited and connected to the additional circuit. After the signal line and the insulation film are patterned, an organic insulation film is formed, to thereby have a surface of an uneven configuration depending on a step formed by the signal line and the insulation film. A reflective electrode is formed on the organic insulation film, to thereby have a surface of an uneven configuration. This eliminates the need to perform a photolithography process step for the formation of the surface of the organic insulation film in the uneven configuration, thereby reducing manufacturing costs.

1 Claim, 9 Drawing Sheets

F I G . 1
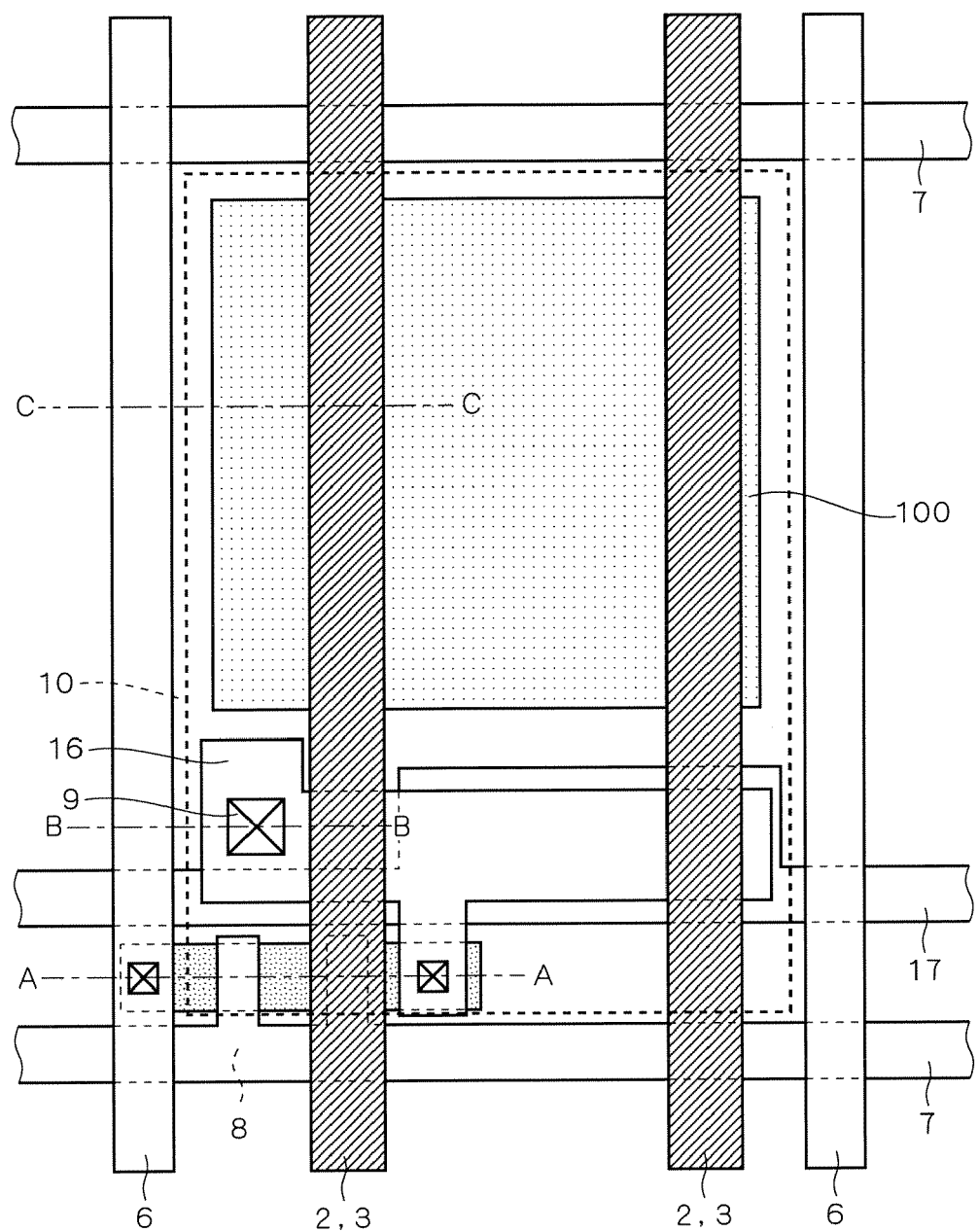

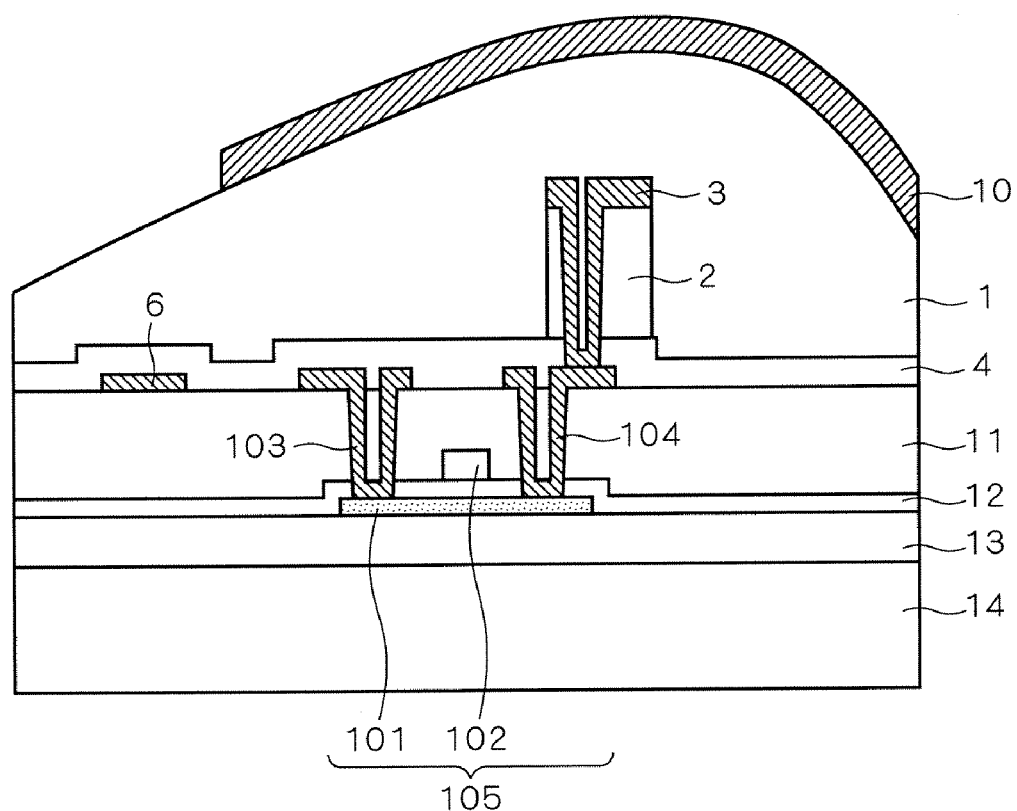
F I G . 4

F I G. 5
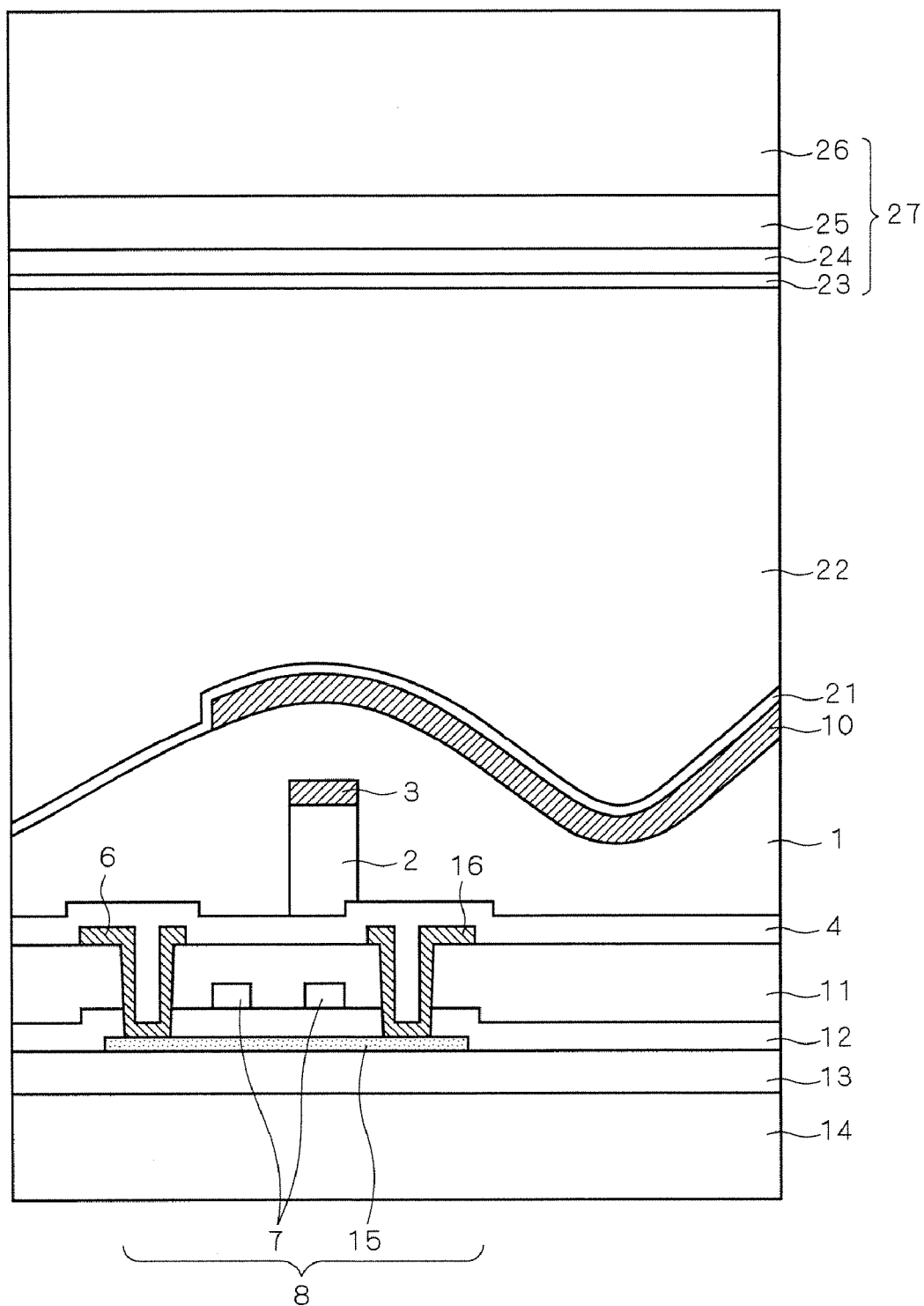

F I G . 6
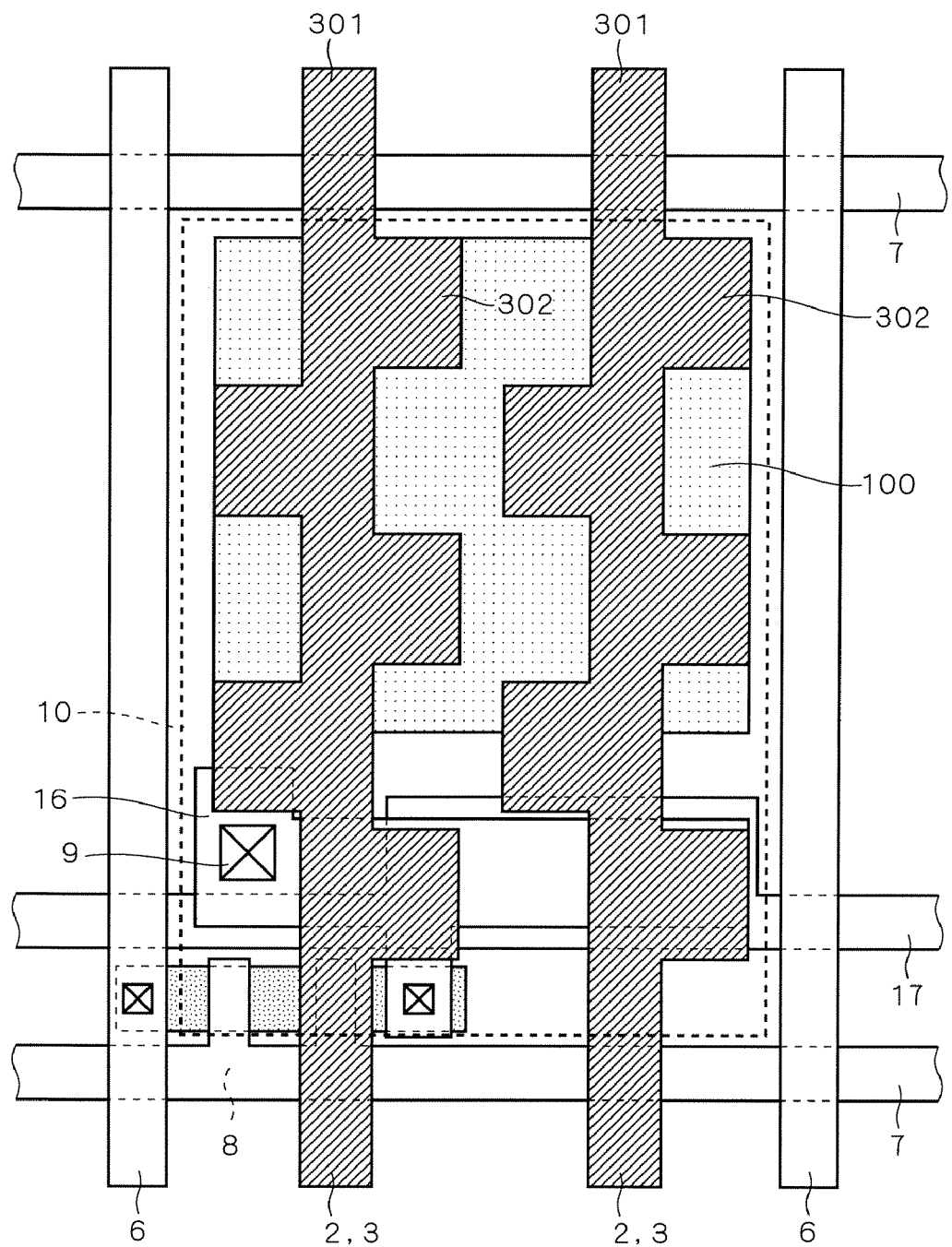

F I G . 7
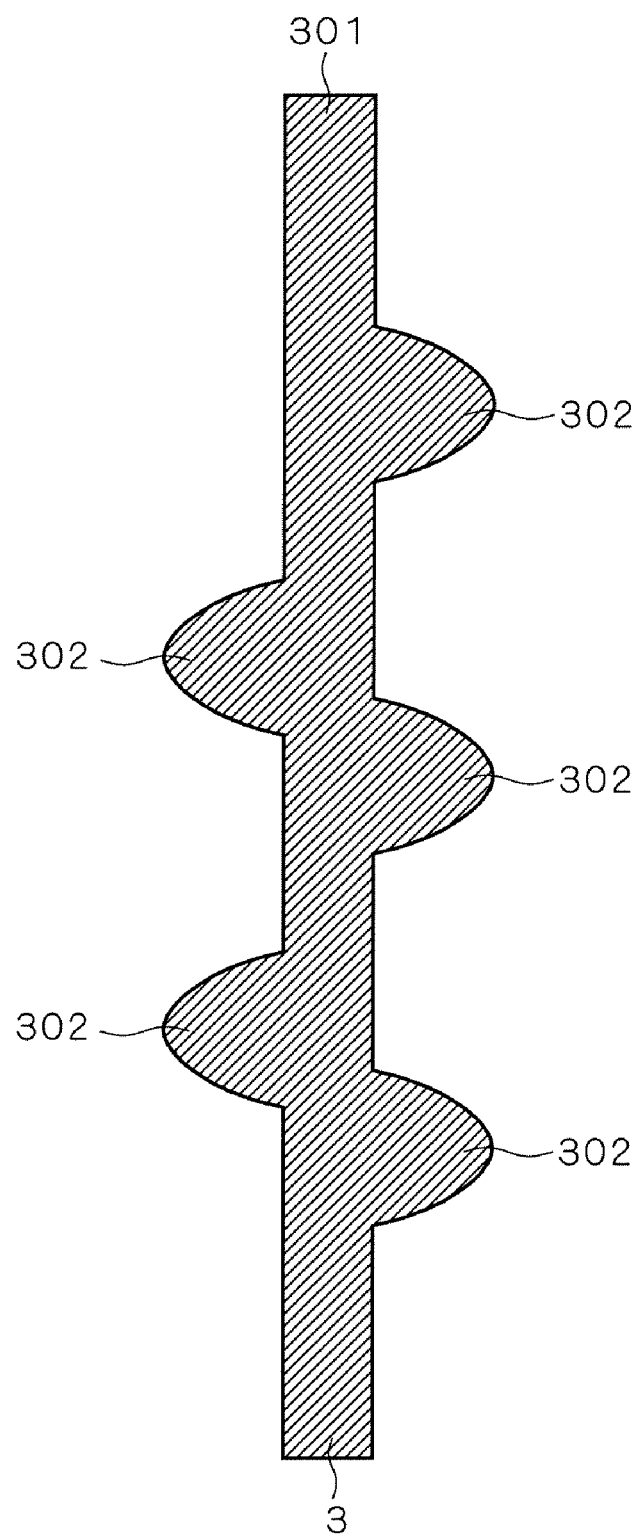

F I G . 8
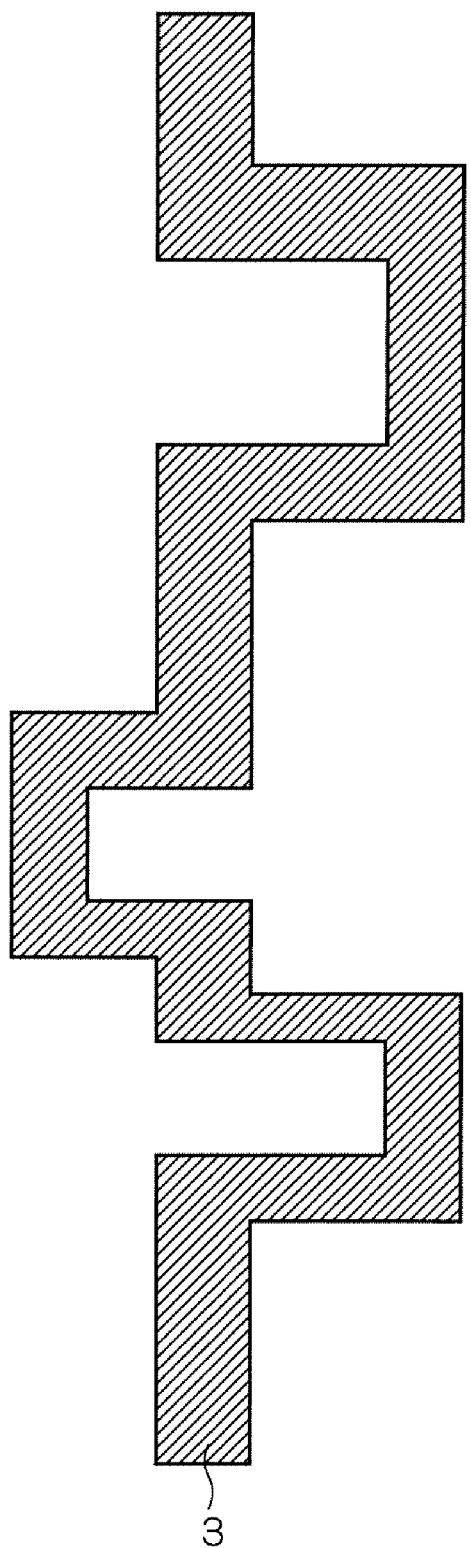

ARRAY SUBSTRATE FOR AN IMAGE DISPLAY DEVICE

BACKGROUND OF THE INVENTION

1. Field of the Invention

The present invention relates to an image display device and, more particularly, to a technique for making a reflective electrode surface uneven.

2. Description of the Background Art

In a reflective liquid crystal display device as an example, a reflective electrode for reflecting external light toward a liquid crystal layer is connected to a pixel TFT, with an organic insulation film therebetween. Main reasons for the use of the organic insulation film are that the low relative dielectric constant of the organic insulation film reduces unnecessary capacitances between the reflective electrode and interconnect lines and that the increased thickness of the organic insulation film can be easily achieved.

Japanese Patent No. 3564358 discloses a technique for making the surface of the organic insulation film uneven to make the surface of the reflective electrode accordingly uneven, thereby providing a display device having a high level of visibility. In the technique disclosed in Japanese Patent No. 3564358, the unevenness of the surface of the organic insulation film is achieved by a photolithography process after the formation of the organic insulation film.

In recent years, a driving circuit has been formed on a peripheral portion of a substrate on which pixels are formed, whereby the size reduction of the display device has been accomplished. In the future, it can be expected that a controller circuit or the like in addition to the driving circuit will be formed on the same substrate. However, such a technique has presented a problem in reducing the proportion of a display area on the substrate.

Japanese Patent Application Laid-Open No. 10-104663 (1998) discloses a technique for solving the problem as mentioned above. The technique disclosed in Japanese Patent Application Laid-Open No. 10-104663 increases the proportion of the display area in the area of the substrate by forming at least one logic circuit partially or entirely under the reflective electrode within the display area.

However, simply combining the technique disclosed in Japanese Patent No. 3564358 and the technique disclosed in Japanese Patent Application Laid-Open No. 10-104663 together presents a problem such that the process of making the surface of the reflective electrode uneven requires the addition of another photolithography process step after the at least one logic circuit is formed partially or entirely under the reflective electrode, thereby resulting in an increased number of manufacturing steps.

SUMMARY OF THE INVENTION

It is an object of the present invention to provide an image display device which achieves the reduction in the number of manufacturing steps for the formation of an interconnect layer under a reflective electrode and for the formation of a reflective electrode surface in an uneven configuration.

According to a first aspect of the present invention, an image display device includes a substrate, a first insulation layer, an interconnect line, a second insulation layer, and a reflective electrode. The first insulation layer is formed over the substrate. The interconnect line is formed in a predetermined pattern configuration on the first insulation layer. The interconnect line forms a step in conjunction with the first insulation layer. The second insulation layer is formed on the interconnect line and includes a surface of an uneven configuration dependent on the step. The reflective electrode is formed on the second insulation layer and includes a surface of an uneven configuration dependent on the uneven configuration of the surface of the second insulation layer.

This eliminates the need for a photolithography process for the formation of the surface of the second insulation layer in the uneven configuration to reduce the number of manufacturing steps, thereby reducing manufacturing costs.

According to a second aspect of the present invention, an image display device includes a substrate, a first insulation layer, an interconnect line, a second insulation layer, and a reflective electrode. The first insulation layer is formed over the substrate. The interconnect line is formed on the first insulation layer. The interconnect line is of such a configuration as to include a conductive portion for conduction and a protruding portion provided on a side surface of the conductive portion. The interconnect line forms a step in conjunction with the first insulation layer. The second insulation layer is formed on the interconnect line and includes a surface of an uneven configuration dependent on the step. The reflective electrode is formed on the second insulation layer and includes a surface of an uneven configuration dependent on the uneven configuration of the surface of the second insulation layer.

This provides the more complicated uneven configuration of the surface of the second insulation layer, to provide the more complicated uneven configuration of the surface of the reflective electrode, thereby improving the visibility of the image display device.

According to a third aspect of the present invention, an image display device includes a substrate, a first insulation layer, an interconnect line, a second insulation layer, and a reflective electrode. The first insulation layer is formed over the substrate. The interconnect line is formed on the first insulation layer. The interconnect line is of a winding configuration composed of straight line segments or a curved line segment. The interconnect line forms a step in conjunction with the first insulation layer. The second insulation layer is formed on the interconnect line and includes a surface of an uneven configuration dependent on the step. The reflective electrode is formed on the second insulation layer and includes a surface of an uneven configuration dependent on the uneven configuration of the surface of the second insulation layer.

This provides the more complicated uneven configuration of the surface of the second insulation layer, to provide the more complicated uneven configuration of the surface of the reflective electrode, thereby improving the visibility of the image display device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic plan view of a portion of a reflective liquid crystal display device corresponding to one pixel according to a first preferred embodiment of the present invention;

FIG. 4 is a schematic sectional view taken along the line C-C of FIG. 1;

FIG. 5 is a view showing a sectional structure of the reflective liquid crystal display device according to the first preferred embodiment;

FIG. 6 is a schematic plan view of a portion of the reflective liquid crystal display device corresponding to one pixel according to a second preferred embodiment of the present invention;

FIGS. 7 and 8 are plan views of a signal line according to the second preferred embodiment;

DESCRIPTION OF THE PREFERRED EMBODIMENTS

First Preferred Embodiment

Figure 2:
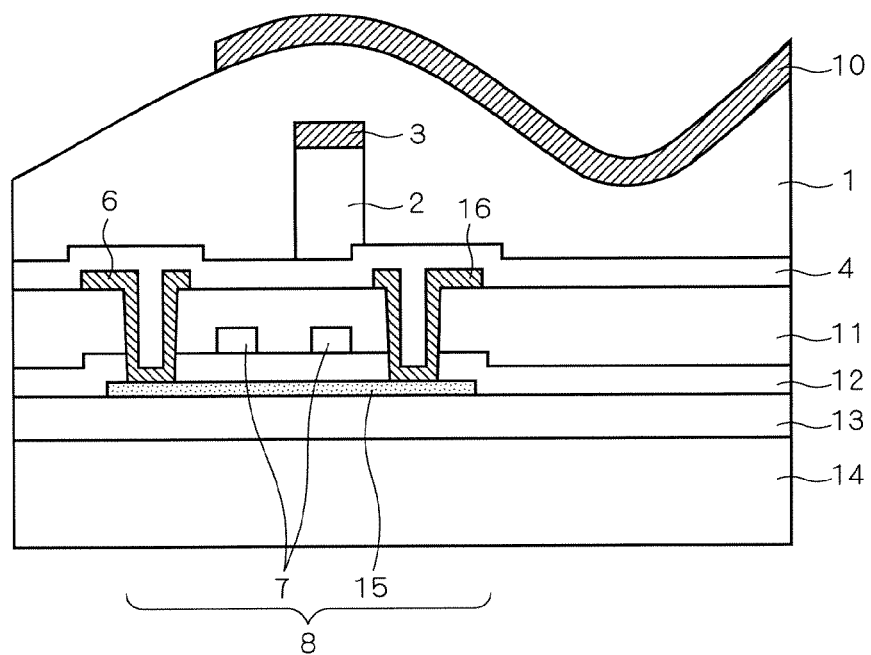
FIG. 2 is a schematic sectional view taken along the line A-A of FIG. 1.

An image display device according to a first preferred embodiment of the present invention will now be described by taking an active-drive reflective liquid crystal display device as an example. The reflective liquid crystal display device is constructed such that a layer of liquid crystal (corresponding to a display material) is sandwiched between a substrate including reflective electrodes and a substrate including a common electrode. The reflective liquid crystal display device causes the reflective electrodes to reflect external light toward the liquid crystal layer, thereby displaying an image. According to the present invention, scattering the external light by further forming the surface of the reflective electrodes in an uneven configuration improves the visibility of the image display device.

The reflective liquid crystal display device includes a plurality of pixels arranged in a matrix. Pixel TFTs (Thin Film Transistors) serving as switching elements for the respective pixels are formed on the substrate including the reflective electrodes to drive the respective pixels. This substrate is referred to hereinafter as an array substrate. A color filter is provided on the substrate including the common electrode. This substrate is referred to hereinafter as a color filter substrate.

FIG. 1 is a schematic plan view showing a structure of a portion of the reflective liquid crystal display device corresponding to a single pixel region on the array substrate provided with the pixel TFTs. A plurality of scanning lines 7 are substantially orthogonal to a plurality of signal lines 6. A pixel TFT 8 is formed near each of the intersections of the scanning lines 7 and the signal lines 6. A capacitor interconnect line 16 connects the pixel TFT 8 and a reflective electrode 10 to each other. The capacitor interconnect line 16 is combined with a common interconnect line 17 to form a storage capacitor for maintaining the voltage on a corresponding pixel. The common interconnect line 17 and the scanning lines 7 are formed in the same layer. A region surrounded by the scanning lines 7 and the signal lines 6 corresponds to a pixel. When a predetermined one of the scanning lines 7 is selected, the pixel TFT 8 corresponding thereto turns ON, and an image signal from the signal lines 6 is provided to the pixel.

An additional circuit 100 is formed under the reflective electrode 10. An example of the additional circuit 100 is a memory circuit (a memory-in-pixel). The provision of a storage element for each pixel reduces the power consumption of the reflective liquid crystal display device. The additional circuit 100 is not limited to the memory circuit but may be a signal amplifier circuit, a controller circuit and the like.

Signal lines 3 (corresponding to interconnect lines) have a pattern configuration parallel with that of the signal lines 6, and connect circuit TFTs (not shown) constituting the additional circuit 100 to each other to transmit a signal thereto. Although shown as disposed in parallel with the signal lines 6, the signal lines 3 may be perpendicular to the signal lines 6. The number of signal lines 3 within the single pixel region may be three or more. The direction in which the signal lines 3 extend and the required number of signal lines 3 are determined in consideration for the circuit design of the additional circuit 100 and the uneven configuration of the surface of the reflective electrode 10 to be described later.

Figure 3:
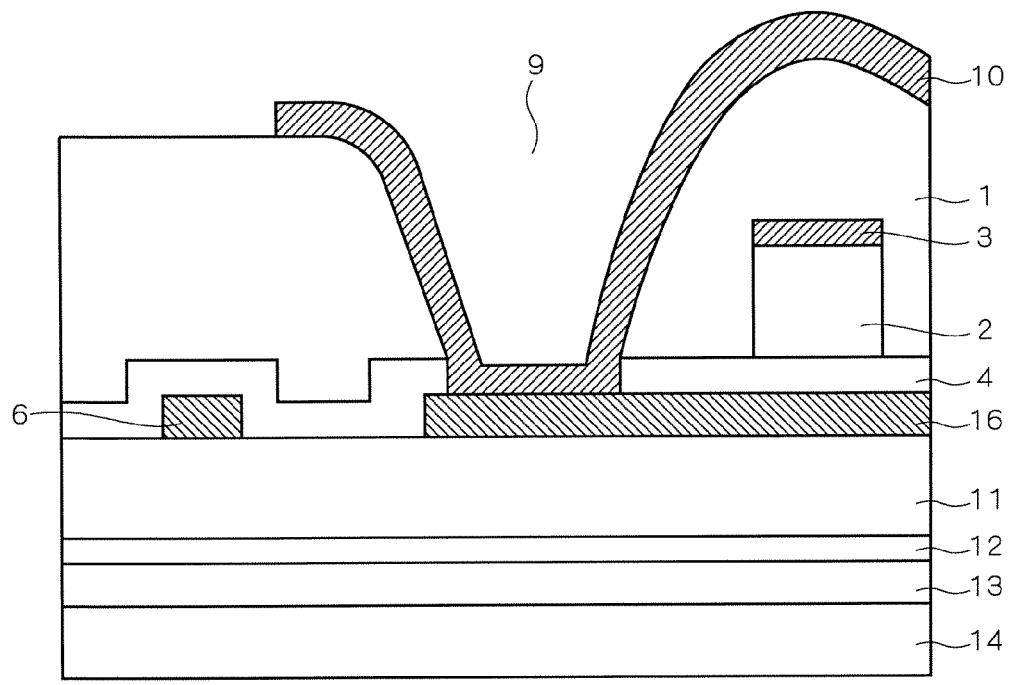
FIG. 3 is a schematic sectional view taken along the line B-B of FIG. 1.

FIGS. 2 through 4 are schematic sectional views showing the sections of the pixel region shown in FIG. 1. FIG. 2 shows a section taken along the line A-A of FIG. 1, FIG. 3 shows a section taken along the line B-B of FIG. 1, and FIG. 4 shows a section taken along the line C-C of FIG. 1. In the section taken along the line A-A as shown in FIG. 2, an underlying protective film 13 is formed on a glass substrate 14, and the pixel TFT 8 is formed on the underlying protective film 13. The pixel TFT 8 includes a semiconductor film 15, a gate insulation film 12, one of the scanning lines 7 (a gate electrode), one of the signal lines 6 (a source electrode), and the capacitor interconnect line 16 (a drain electrode). Part of each of the signal line 6 and the capacitor interconnect line 16 is formed along a contact hole provided in an interlayer insulation film 11, and is connected to the semiconductor film 15.

A passivation film 4 for protection of interconnect lines is deposited. An insulation film 2 (corresponding to a first insulation layer) is formed on the passivation film 4, and one of the signal lines 3 is formed on the insulation film 2. An organic insulation film 1 (corresponding to a second insulation layer) is formed on the signal line 3 so as to cover the signal line 3 and the insulation film 2. The reflective electrode 10 is formed on the organic insulation film 1.

In the section taken along the line B-B as shown in FIG. 3, the underlying protective film 13, the gate insulation film 12 and the interlayer insulation film 11 are deposited in a stacked relation in the order named on the glass substrate 14, and the signal line 6 and the capacitor interconnect line 16 are formed on the interlayer insulation film 11, in a manner similar to those shown in FIG. 2. The passivation film 4 for protection of the interconnect lines is further formed. The insulation film 2 is formed on the passivation film 4, and the signal line 3 is formed on the insulation film 2. The organic insulation film 1 is formed on the signal line 3 so as to cover the signal line 3 and the insulation film 2. The reflective electrode 10 is formed on the organic insulation film 1. Part of the reflective electrode 10 is formed along a contact hole 9 provided in the organic insulation film 1, and is connected to the capacitor interconnect line 16. Thus, the reflective electrode 10 is connected through the capacitor interconnect line 16 to the pixel TFT 8.

In the section taken along the line C-C as shown in FIG. 4, the underlying protective film 13 is formed on the glass substrate 14, and a circuit TFT 105 constituting the additional circuit 100 is formed on the underlying protective film 13, in a manner similar to those shown in FIG. 2. The circuit TFT 105 includes a semiconductor layer 101, the gate insulation film 12, a gate electrode 102, a source electrode 103, and a drain electrode 104. The circuit TFT 105 is formed simultaneously with the formation of the pixel TFT 8.

The passivation film 4 for protection of the interconnect lines is further formed. The insulation film 2 is formed on the passivation film 4, and the signal line 3 is formed on the insulation film 2. Part of the signal line 3 is formed along a contact hole provided in the insulation film 2, and is connected to the circuit TFT 105. The organic insulation film 1 is formed on the signal line 3 so as to cover the signal line 3 and the insulation film 2. The reflective electrode 10 is formed on the organic insulation film 1.

As shown in FIGS. 2 through 4, the surface of the organic insulation film 1 has an uneven configuration corrugated in a direction perpendicular to the signal line 6. Similarly, the surface of the reflective electrode 10 has an uneven configuration dependent on the uneven configuration of the surface of the organic insulation film 1. Because the insulation film 2 has the same configuration as the pattern configuration of the signal line 3 and forms a step in conjunction with the signal line 3, the formation of the organic insulation film 1 after the formation of the insulation film 2 and the signal line 3 causes the surface of the organic insulation film 1 to have the uneven configuration depending on the step (i.e., depending on the pattern configuration of the signal line 3).

As described above, the formation of the surface of the organic insulation film 1 in the uneven configuration by the use of the step formed by the insulation film 2 and the signal line 3 (i.e., by the use of the pattern configuration of the signal line 3) eliminates the need to perform a lithography process step for the formation of the uneven surface of the organic insulation film 1, thereby reducing the manufacturing costs.

The thickness of the signal line 3 is typically about 300 to about 500 nm, and the amplitude of the unevenness of the surface of the reflective electrode 10 which is greater than the thickness of the signal line 3 is advantageous for reflective characteristics including the visibility. The first preferred embodiment controls the thickness of the insulation film 2 to thereby control the amplitude of the unevenness of the surface of the reflective electrode 10 to a desired value.

The steps of manufacturing characteristic parts according to the first preferred embodiment will be briefly described. After the passivation film 4 is deposited, the insulation film 2 is deposited to a desired thickness. After a contact hole for connection to the circuit TFT 105 constituting the additional circuit 100 is formed, the signal line 3 is deposited on the insulation film 2. Thereafter, the signal line 3 and the insulation film 2 are etched into a pattern by a photolithography process.

It is necessary that the material of the insulation film 2 ensures a sufficient etch selectivity to the material of the passivation film 4. When a nitride film is used as the passivation film 4 as an example, an oxide film or an organic film is preferably used as the insulation film 2. When an oxide film is used as the passivation film 4, a nitride film may be used as the insulation film 2. Thus, the film thickness control of the insulation film 2 is easily accomplished. Although part of the insulation film 2 other than directly under the signal line 3 is shown as entirely removed by etching, the present invention is not limited to this. The part of the insulation film 2 other than directly under the signal line 3 may be partially left unremoved.

Subsequently, the organic insulation film 1 is formed on the passivation film 4 so as to cover the signal line 3 and the insulation film 2. The reflective electrode 10 is deposited on the organic insulation film 1. This completes the array substrate shown in FIGS. 1 through 4.

Next, the final sectional structure of the reflective liquid crystal display device is shown in FIG. 5. An alignment layer 21 for controlling the orientation of the liquid crystal material on the array substrate side is formed on the array substrate described with reference to FIGS. 1 through 4.

A color filter substrate 27 is formed. A liquid crystal 22 corresponding to the display material is held between the array substrate and the color filter substrate 27 opposed to each other, whereby the reflective liquid crystal display device is completed. The color filter substrate 27 includes an insulative transparent substrate made of glass and the like as an opposed substrate 26, a color filter 25, a common electrode 24 formed by a transparent conductive film made of ITO (Indium Tin Oxide) and the like, and an alignment layer 23, all of which are deposited in a stacked relation in the order named.

Second Preferred Embodiment

An image display device according to a second preferred embodiment of the present invention will now be described by taking a reflective liquid crystal display device as an example. The reflective liquid crystal display device according to the second preferred embodiment is identical in construction with the reflective liquid crystal display device according to the first preferred embodiment except the pattern configuration of the signal line 3 and the insulation film 2 to be described below. For the purpose of avoiding repetition, identical or corresponding components are designated by like reference numerals or characters, and will not be described.

FIG. 6 is a schematic plan view showing a structure of a portion of the reflective liquid crystal display device corresponding to a single pixel display region on the array substrate provided with the pixel TFTs. Each of the signal lines 3 is shaped to include a conductive portion 301 for conduction, and protruding portions 302 each protruding in a horizontal direction parallel to the glass substrate 14 and perpendicular to the conductive portion 301. The insulation films 2 have the same configuration as the pattern configuration of the signal lines 3 shown in FIG. 6. Therefore, the surface of the organic insulation film 1 and the surface of the reflective electrode 10 which are formed over the signal lines 3 have an uneven configuration depending on the step formed by each insulation film 2 and each signal line 3 (i.e., depending on the pattern configuration of the signal lines 3).

Thus, the surface of the reflective electrode 10 has an uneven configuration corrugated not only in the direction perpendicular to the signal lines 6 but also in a direction parallel to the signal lines 6. Therefore, the more complicated uneven configuration of the surface of the reflective electrode 10 further increases the scattering efficiency to further improve the visibility of the image display device.

The configuration of the protruding portions 302 is rectangular in FIG. 6, but is not limited to this. For example, the configuration of the protruding portions 302 may be part of an ellipse as shown in FIG. 7. The protruding portions 302 may be of any configuration unless the protruding portions 302 come in contact with a signal line adjacent thereto to cause a short-circuit.

The configuration of the signal lines 3 is not limited to the above-mentioned configurations. For example, as shown in FIG. 8, the signal line 3 may be of a winding configuration composed of straight line segments in a plane parallel to the glass substrate 14 (of a configuration obtained by combining rectangular waves, a zigzag configuration, and so on). Also in this case, the more complicated uneven configuration of the surface of the reflective electrode 10 further increases the external light scattering efficiency to further improve the visibility of the image display device.

Similarly, the signal line 3 may be shaped to achieve any conduction path unless the signal line 3 comes in contact with an interconnect line adjacent thereto to cause a short-circuit.

Figure 10:
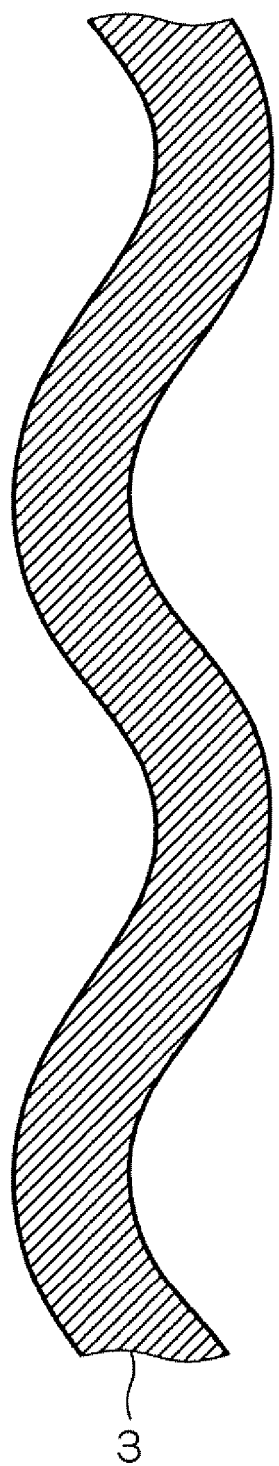
FIG. 10 is a plan view of the signal line according to the second preferred embodiment.

For example, as shown in FIG. 10, the signal line 3 may be winding in a curved line (of a configuration obtained by combining sinusoidal waves).

The signal line 3 is described as the interconnect line for signal transmission for the additional circuit 100 which is formed under the reflective electrode 10 according to the present invention, but is not limited to this. For example, the signal line 3 may be an interconnect line for repair for improving the manufacturing yield. In this case, the signal line 3 need not be connected to other circuits. For example, for the purpose of bypassing a defective location of the signal line 6 which is found defective by using the signal line 3, the signal line 3 is connected to the signal line 6 by using a laser of FIB (Focused Ion Beam) near the defective location, and is cut to length.

Further, the signal line 3 may be used only to make the surface of the reflective electrode 10 uneven without being used for the signal transmission in practice.

The active-drive scheme is described according to the present invention. However, it is needless to say that the present invention is applicable to a passive-drive scheme.

Figure 9:
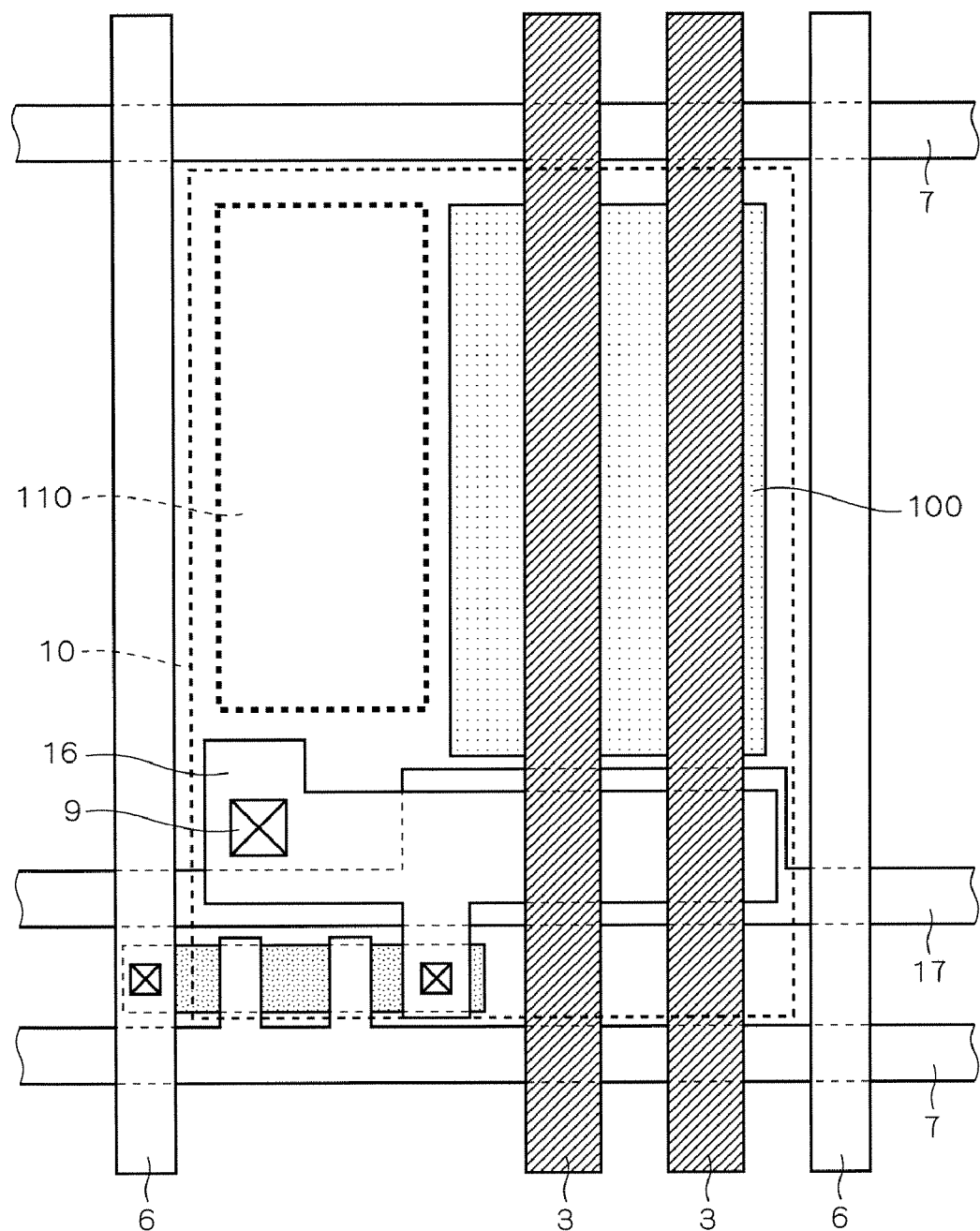
FIG. 9 is a schematic plan view of a portion of a transflective liquid crystal display device corresponding to one pixel.

The above description takes the reflective liquid crystal display device as an example according to the present invention, but a transflective liquid crystal display device is also applicable. In this case, both the reflective electrode 10 and a transparent electrode 110 are present within a single pixel region, as shown in FIG. 9. In the case shown in FIG. 9, the additional circuit 100 is provided and the signal line 3 is formed under the reflective electrode 10, whereby the surface of the reflective electrode 10 is formed in an uneven configuration.

The image display device using the liquid crystal as the display material is described according to the present invention. However, the present invention is also applicable to an image display device using an organic EL material and an inorganic EL material as the display material.

While the invention has been described in detail, the foregoing description is in all aspects illustrative and not restrictive. It is understood that numerous other modifications and variations can be devised without departing from the scope of the invention.

What is claimed is:

1. An image display device comprising:
   a substrate;
   a lower layer interconnect line formed over said substrate;
   a first insulation layer formed over said lower layer interconnect line;
   an upper layer interconnect line formed in a predetermined pattern configuration on said first insulation layer, said upper layer interconnect line and said first insulation layer in combination forming a step, said upper layer interconnect line intersecting said lower layer interconnect line through said first insulation layer;
   a second insulation layer formed on said upper layer interconnect line and including a surface of an uneven configuration dependent on said step;
   a reflective electrode formed on said second insulation layer and including a surface of an uneven configuration dependent on said uneven configuration of said surface of said second insulation layer; and
   a third insulation layer in contact with said first insulation layer and formed under said first insulation layer, said third insulation layer having a high etch selectivity to said first insulation layer,
   wherein said first insulation layer is of the same configuration as said pattern configuration.

* * * * *